(12) United States Patent
Passow

(10) Patent No.: US 6,759,612 B2
(45) Date of Patent: Jul. 6, 2004

(54) MOVABLE CONTACT AND A METHOD OF ASSEMBLING A PUSHER ASSEMBLY HAVING A MOVABLE CONTACT

(75) Inventor: Christian H. Passow, Ann Arbor, MI (US)

(73) Assignee: Siemens Energy & Automation, Alpharetta, GA (US)

( * ) Notice: Subject to any disclaimer, the term of this patent is extended or adjusted under 35 U.S.C. 154(b) by 0 days.

(21) Appl. No.: 09/961,160

(22) Filed: Sep. 21, 2001

(65) Prior Publication Data
US 2003/0056357 A1 Mar. 27, 2003

(51) Int. Cl.[7] .................................................. H01H 1/20
(52) U.S. Cl. ....................... 200/243; 200/247; 200/280; 200/281
(58) Field of Search ............................ 200/243, 245–7, 200/250, 280–1, 447; 29/443

(56) References Cited

U.S. PATENT DOCUMENTS

| 3,324,270 | A | * | 6/1967 | Lacan | ........................ 200/243 |
| 3,436,497 | A | * | 4/1969 | Mading | ....................... 200/243 |
| 3,505,625 | A | * | 4/1970 | Nielsen et al. | .............. 200/280 |
| 4,443,675 | A | * | 4/1984 | Drexler et al. | .............. 200/243 |
| 4,634,819 | A | * | 1/1987 | Ikeda | .......................... 200/243 |
| 6,114,639 | A | * | 9/2000 | Hall et al. | .................. 200/280 |

* cited by examiner

*Primary Examiner*—Renee Luebke

(57) ABSTRACT

A pusher assembly for use in a contact block assembly is disclosed. The pusher assembly comprises a pusher (105); a window (214) extending through the pusher; a first movable contact (106) positioned within the window; and a second movable contact (107) positioned adjacent to said first movable contact within the window. A method of assembling a pusher assembly having a movable contact is also disclosed. The method comprises steps of inserting a first movable contact within a pusher; inserting a second movable contact with the pusher; and retaining the first movable contact and the second movable contact within the pusher by a spring.

34 Claims, 5 Drawing Sheets

MOVABLE CONTACT AND A METHOD OF ASSEMBLING A PUSHER ASSEMBLY HAVING A MOVABLE CONTACT

CROSS-REFERENCE TO RELATED PATENT APPLICATIONS

The present U.S. patent application having at least one common invention as

U.S. patent application Ser. No. 09/961,155 entitled "System and Method for Auxiliary Contact Assembly", and U.S. patent application Ser. No. 09/961,159 entitled "System and Method for Auxiliary Contact Assembly and Snap Mounting", and U.S. patent application Ser. No. 09/961,162 entitled "System and Method for Mounting a Pusher and Moveable Contact in a Contact Block", and U.S. patent application Ser. No. 09/961,156 entitled "System and Method for Mounting a Moveable Contact in a Contact Block, and U.S. patent application Ser. No. 09/961,158 entitled "Contact Block Assembly and Method of Assembling a Contact Block Assembly", and U.S. patent application Ser. No. 09/961,161 entitled "Pusher Assembly and Method of Assembling a Pusher Assembly.

which are filed with the U.S. Patent and Trademark Office concurrently on Sep. 21, 2001, the entirety of each being incorporated herein by reference.

FIELD OF THE INVENTION

The present invention relates to a movable contact, and more particularly to a movable contact used in a pusher assembly of a contact block and to a method of assembling a pusher assembly having a movable contact.

BACKGROUND OF THE INVENTION

Conventional contact blocks, which can be configured both in a 1-pole arrangement or a 2-pole arrangement, include a number of contact elements. When used in a 1-pole arrangement, a movable contact only requires contact surfaces or pads formed on one side of the movable contact. However, when used in a 2-pole arrangement, the movable contact must have contact surfaces formed on both sides of the movable contact. Such movable contacts require an expensive manufacturing process to create a contact surface on both sides of the movable contact.

For example, some conventional movable contacts are produced using a "tape-welding" process in which four continuous strips of silver are welded to both sides of both ends of a strip of copper alloy from which the movable contacts are punched. Other conventional movable contacts are produced by forcing a silver wire through punched holes in the contact blade and then coining the silver wire both top and bottom to form contact surfaces on both sides of the blade. Because 2-pole contact blocks are less common than 1-pole contact blocks, double-sided movable contacts found in conventional 2-pole contacts are produced in lower volume, and are therefore even more costly.

Further, contact block assemblies are often assembled by hand, and often have a number of springs which make the assembly difficult. In particular, when assembling components of a conventional contact block assembly, it may be necessary for an assembler to compress a spring in order to insert another component of the assembly. In such situations, it is often common that the spring becomes dislodged, and in many cases may becomes lost. More importantly, the difficulty in assembling the contact block may cause additional fatigue on a worker and an increase in assembly errors.

Such problems are particularly true of pusher assemblies, which often have smaller springs that are more difficult to manipulate with the human hand. In particular, inserting a small spring into a pusher by compressing the spring can be difficult. Further, when a pusher assembly is assembled in a contact block, it is beneficial if the components of the pusher assembly are secured within the pusher assembly. That is, the pusher assembly could be picked up and placed in the contact block housing without any fear that components of the pusher assembly would become dislodged. Accordingly, there is a need for a movable contact which can be used as a pair of movable contacts for a 2-pole contact block assembly.

SUMMARY OF THE INVENTION

The present invention relates to a movable contact having a pair of contact elements extending from each end of a body portion. Each contact element comprises a pair of contact fingers, wherein each contact finger has an inclined portion leading to a contact surface which is substantially parallel to the body portion.

According to another aspect of the invention, a pusher assembly for use in a contact block assembly comprises a housing portion, a window formed in the housing portion, and a movable contact positioned within the window. The movable contact comprises a body portion and a pair of contact portions coupled to the ends of the body portion. Each contact portion has a pair of contact fingers having an inclined portion and a contact element.

According to another aspect of the invention, two movable contact having contact fingers with an inclined portion and a contact element could be placed back to back.

According to yet another aspect of the invention, a pusher assembly for use in a contact block assembly comprises a pusher, a window extending through the pusher, a first movable contact positioned within the window, and a second movable contact positioned adjacent to the first movable contact within the window.

According to another aspect of the invention, a method of assembling a pusher assembly having a movable contact comprises the steps of inserting the first movable contact within a pusher; inserting a second movable contact within the pusher; and retaining the first movable contact and the second movable contact within the pusher by a spring.

It is an object of the invention to provide a movable contact which can be used in either a 1-pole or a 2-pole contact block assembly.

It is a further object of the invention to provide a movable contact which can be coupled with a second movable contact to form a pair of movable contacts for use in a 2-pole contact block assembly.

It is a further object of the invention to provide a pusher assembly for receiving a pair of movable contacts for use in a 2-pole arrangement in a contact block assembly.

Finally, it is an object of the invention to provide a method for assembling a contact block assembly having a pair of movable contacts.

Other objects and advantages will become apparent from the following specification taken in connection with the accompanying drawings.

DESCRIPTION OF THE PREFERRED EMBODIMENTS

Figure 1:
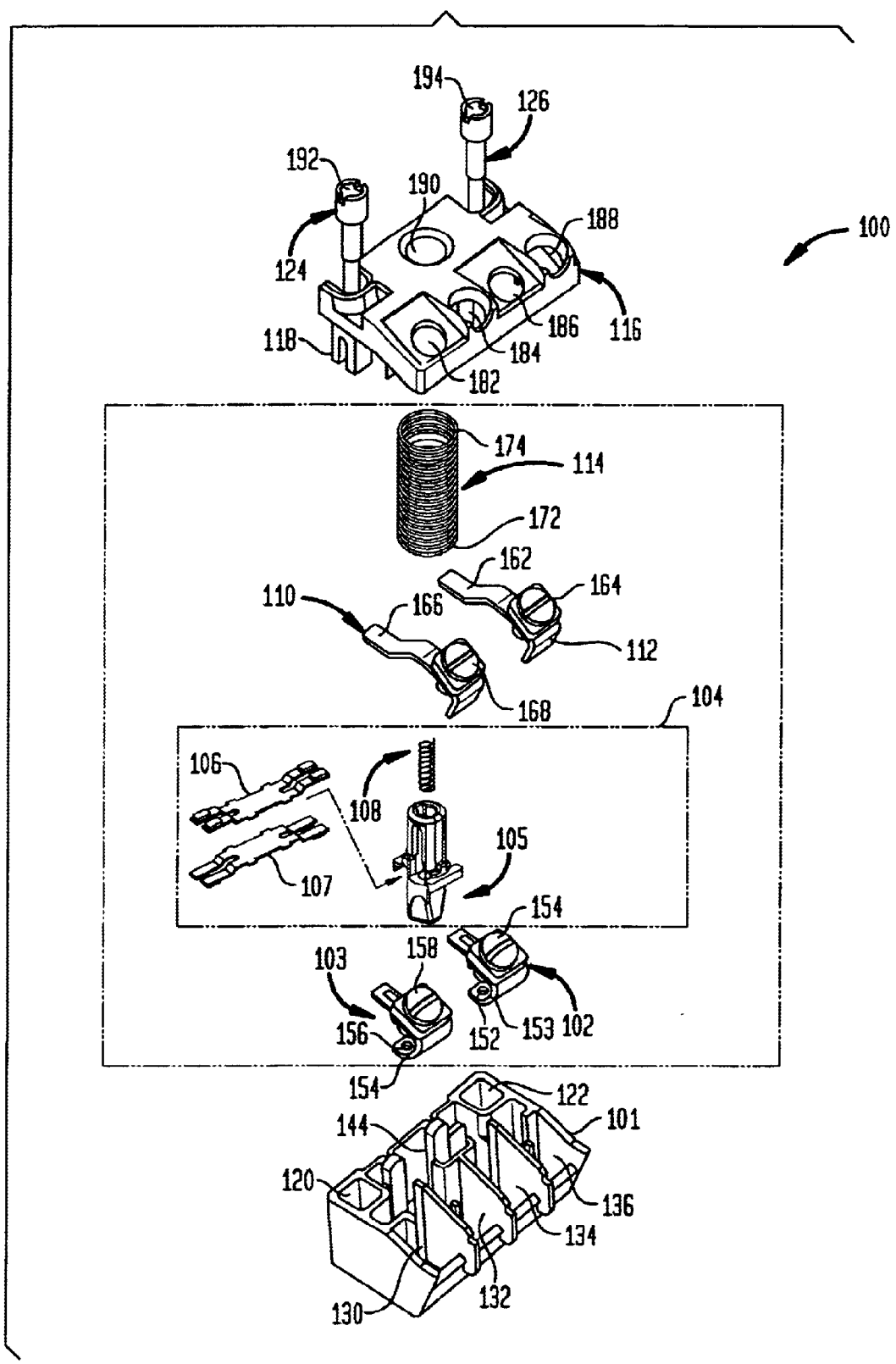
FIG. 1 is an exploded view of a contact block assembly according to the present invention.

Turning first to FIG. 1, an exploded view of a contact block assembly 100 according to the present invention is shown. The contact block assembly 100 comprises a lower housing 101 for receiving stationary contacts 102 and 103, and a pusher assembly 104. The pusher assembly 104 includes a pusher 105, a movable contact 106 and a contact spring 108. The contact block assembly 100 further includes stationery contacts 110 and 112. Although four stationery contacts are shown for a two pole contact block assembly, two stationery contacts could be employed in a one pole contact block assembly, as is well known in the art. Also, the orientation or shape of the stationery contacts could vary, depending upon whether the contact block assembly 100 is configured to be in an "normally open" or "normally closed" arrangement, as is well known in the art. The contact block assembly further includes a return spring 114 and a cover 116. When the contact block is assembled, a snap 118 is coupled to a complimentary receiving portion 120 to secure the cover 116 to the lower housing 101. A similar snap (not visible) is coupled to a second receiving portion 122. Finally, screws 124 and 126 enabling contact blocks to be stacked or coupled to an operator, as is well known in the art.

The lower housing 101 further includes recesses 130, 132, 134, and 136 for receiving the stationery contacts 102, 103, 110, and 112. The lower housing 101 further includes a recess 144 for receiving the pusher assembly 104. The stationery contact 102 further includes a contact portion 152 and a contact screw 154. A contact surface 153 is associated with the contact portion 152. Similarly, a contact portion 156, a contact surface 157 and a contact screw 158 are shown on the stationary contact 103. The stationary contact 112 includes a contact 162 and a contact screw 164, while the stationary contact 110 includes a contact 166 and a contact screw 168. Contact surfaces (not visible) are formed on the underside of contacts 162 and 166. The return spring 114 extends from a first end 172 to a second end 174. Finally, cover 116 includes openings 182, 184, 186, and 188 for enabling access to contact screws 154, 158, 164, and 168. Also, an opening 190 and threaded portions 192 and 194 enable the coupling of multiple contact block assemblies, as is well known in the art.

Figure 2:
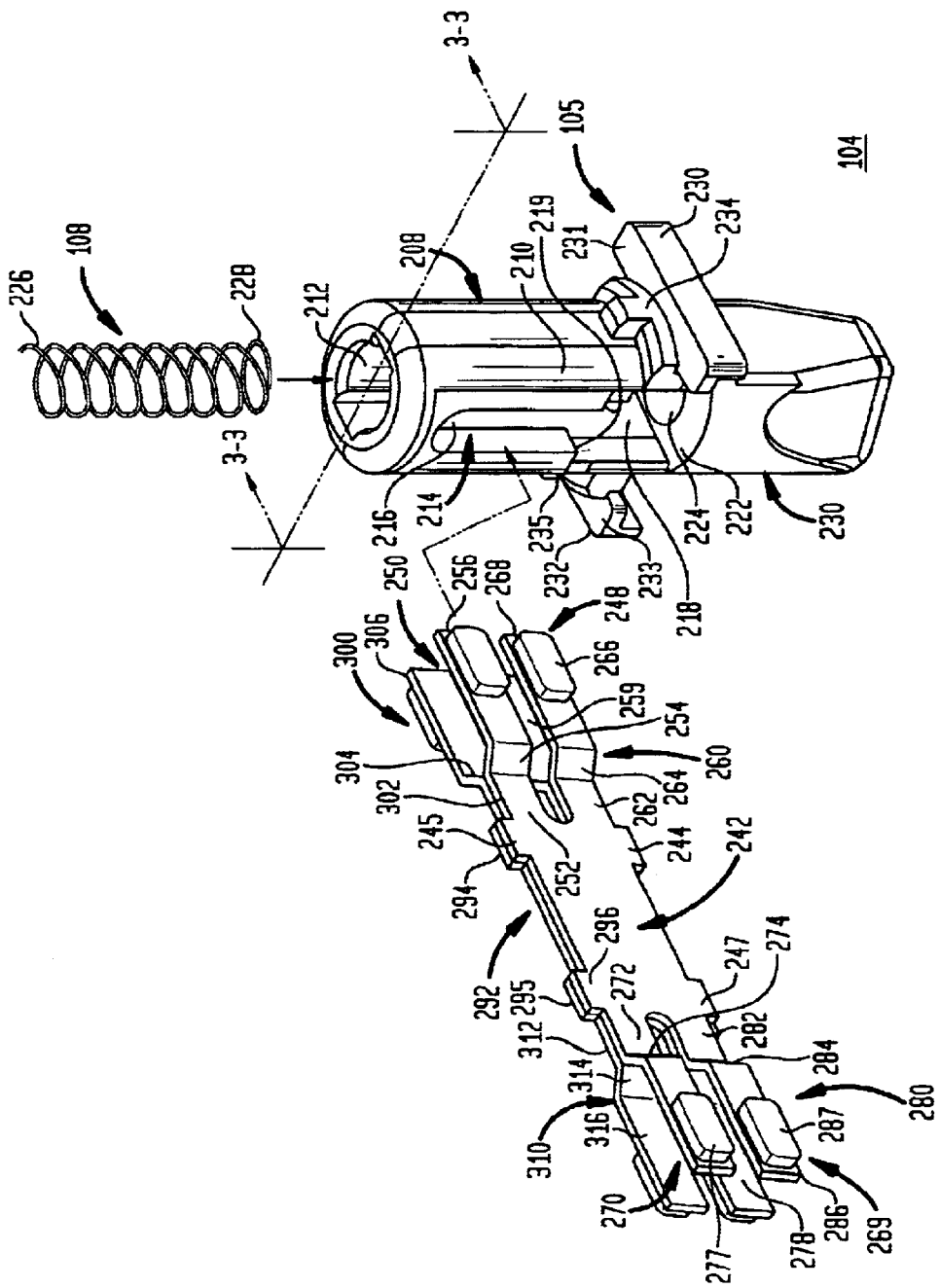
FIG. 2 is an exploded view of a pusher assembly according to the present invention.

Turning now to FIG. 2, an exploded view of the pusher assembly 104 is shown. The pusher 105 comprises a body portion 208 which includes an upper portion 210 having a recess 212 formed at a first end of the pusher 105, as shown at the top in the orientation of FIG. 2. The recess 212 enables an easy loading of the contact spring (i.e. the contact spring does not need to be compressed to be loaded into the pusher 105, but merely dropped into the recess 212). A window 214 is also formed in a side of the pusher 105, and extends through the back side (not visible). The window 214 includes an entry window portion 216 and a main window portion 218. The entry window portion 216 is long enough and wide enough to receive the movable contact 106 in the orientation shown in FIG. 2, as will be described in more detail in reference to the remaining figures. Similarly, the main window portion 218 is long enough and wide enough to allow the rotation of the movable contact 106 to a second orientation, such as the orientation shown in FIG. 6. The positioning of the entry window portion 216 and the main window portion 218 adjacent to each other creates shoulder portions 219 as shown in FIG. 2. The assembly of the pusher assembly 104 will be described in more detail in reference to FIGS. 4 and 5.

The pusher assembly 105 further includes a lower body portion 220 having a ledge 222 and a lower recess 224. The spring 108, which extends from a first end 226 to a second end 228, is generally inserted through the recess 212 into the lower recess 224. Finally, pusher 105 includes a first mounting arm 230 having a ledge 231 and a second mounting arm 232 having a ledge 233. The mounting arms 230 and 232 further include guides 234 and 235 respectively for receiving and properly positioning the return spring 114.

The mounting arms 230 and 232 may be of a different size and/or shape to prevent an inadvertent error in inserting the pusher assembly into a contact block housing. In particular, by forming the first mounting arm 230 and the second mounting arm 232 of different shapes, the incorrect insertion of the pusher assembly into a contact block assembly could be avoided.

The movable contact 106 comprises a body portion 242 which is substantially flat. The flat body portion of the movable contact further enables an easy assembly of the pusher. As will be described in detail in reference to FIGS. 5 and 6, the movable contact 106 is easily moved into the main window portion 218 because the contact spring 108 is retained in the lower recess 224. Any compression of the contact spring 108 into the recess will not cause the contact spring 108 to become dislodged from the lower recess 224. The body portion being substantially flat on both sides also enables mounting for both normally open and normally closed configurations.

The movable contact also has a first flange 244 extending from a first side and a second flange 245 extending from a second side. The movable contact 106 includes a second set of flanges including a third flange 246 extending from the first side and a fourth flange 247 extending from the second side. Flanges 244 through 247 are generally included to retain the movable contact 106 within the pusher 105. Although four flanges are shown, two flanges could be used to retain the movable contact 106 within the pusher 105. While the flanges as shown are symmetric, the number, shape and/or orientation of flanges could be chosen to prevent the improper insertion of the movable contact 106 into the pusher 105.

The movable contact 106 further includes a first contact element 248 extending from a first end of the body portion 242. The first contact element 248 includes a first finger 250 having a fulcrum portion 252, an inclined portion 254, and a contact portion 256. The contact portion includes a contact surface 258. The contact surface could be composed of any conductive material, such as silver, applied by plating, bonding, soldering or some other suitable method. A slot 259 separates the first contact finger 250 from a second contact finger 260. The second contact finger 260 comprises a fulcrum portion 262, an inclined portion 264, and a contact portion 266, also having a contact surface 268.

A second contact element 269 extending from a second end of the movable contact includes a third finger 270 having a fulcrum portion 272, an inclined portion 274, and a contact portion 276 having a contact surface 277. A slot 278 separates the third contact finger 270 from a fourth contact finger 280. Similarly, the fourth contact finger includes a fulcrum portion 282, an inclined portion 284, and a contact portion 286 having a contact surface 287.

Also shown in FIG. 2 is a body portion 292 and flanges 294 and 295 of the movable contact 107, which is adjacent to movable contact 106. A first finger 300 extends from a first end of the body portion 292 and has a fulcrum portion 302 leading to an inclined portion 308 and a contact portion 306. Similarly, a third finger 310 includes a fulcrum portion 312 and an inclined portion 314 leading to a contact portion 316. Although not visible in FIG. 2, a second and fourth finger are visible in FIG. 4, which shows a side elevation view of the movable contacts positioned in a back to back arrangement.

The movable contacts 106 and 107 have split or bifurcated contact fingers to increase the probability that they will make contact with the stationary contacts even in the presence of surface oxides and/or foreign particles on the contact surfaces. Maintaining independent motion of the bifurcated tips of movable contacts which are stacked back to back requires that the movable contacts be slightly separated by an offsets in the contact fingers. That is, the inclined portions of the fingers of the movable contacts enables proper operation of the movable contacts when stacked back to back. Alternatively, a spacer could be used to create a separation.

Figure 3:
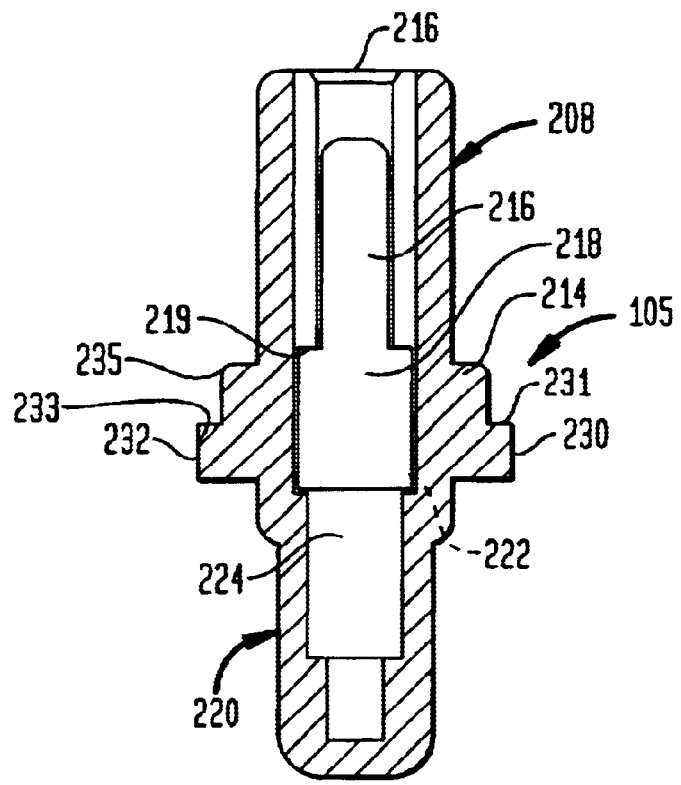
FIG. 3 is a cross-sectional view of the pusher of FIG. 2 taken at lines 3—3.

Turning now to FIG. 3, a cross-section of the pusher 105 is shown. As is more clear in this cross-section, the entry window portion 216 and the main window portion 218, as shown, extend through the upper body portion 210. Also shown is recess 212 extending through the top of the upper body portion 219 to recess 224 in the lower body portion 220 for receiving the contact spring 108.

Figure 4:
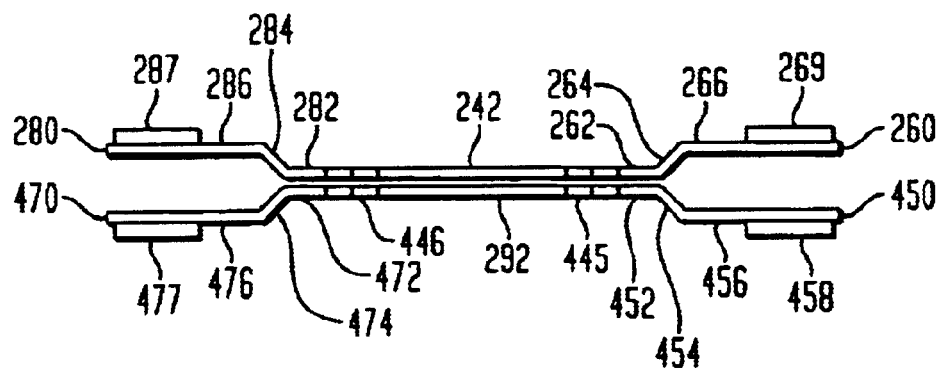
FIG. 4 is a side elevational view of a pair of movable contacts according to the present invention.

As shown in FIG. 4, the movable contacts 106 and 107, when positioned back to back, create a stacked movable contact pair which can be used in a two pole contact block assembly. Generally, because the body portions 242 and 292 are substantially flat, they can lay flat against each other. A second contact finger 450 extends from a first end of body portion 292 and includes a fulcrum portion 452 and an inclined portion 454 leading to a contact portion 456. A contact surface 458 is also preferably applied to the contact portion 456. Flanges 445 and 446 are also visible on a second edge of the body portion 292. Finally, a fourth finger 470 extends from a second end of the body portion 292. In particular, a fulcrum portion 472 and an inclined portion 474 lead to a contact portion 476. Preferably, a contact surface 477 is applied to contact portion 476.

Figure 5:
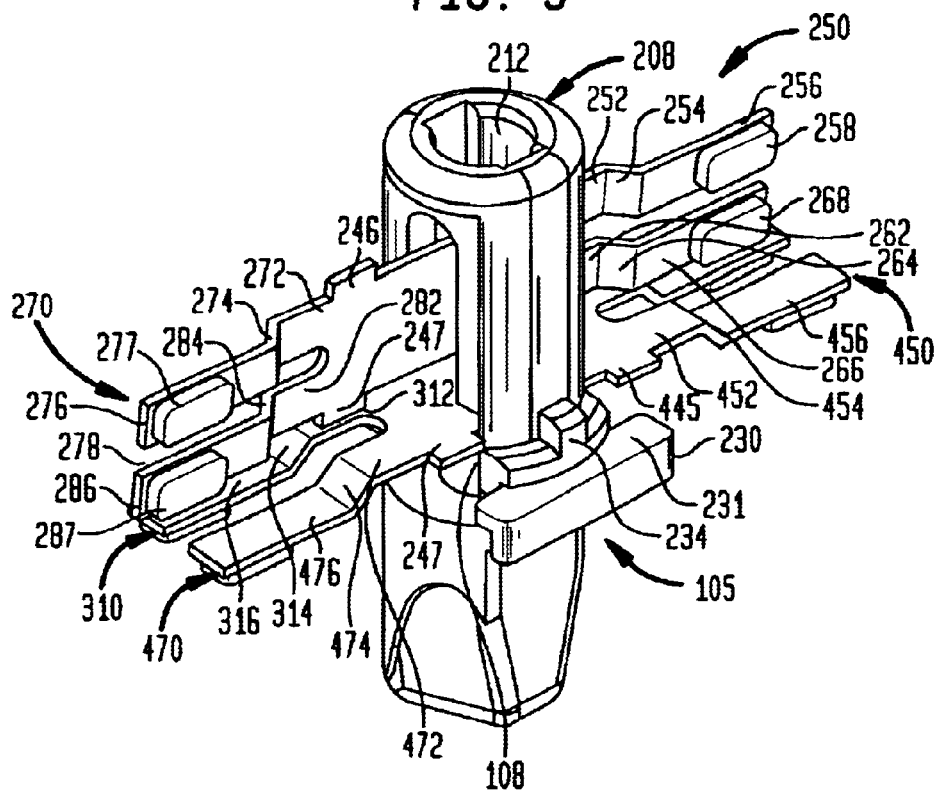
FIG. 5 is a perspective view of the pusher assembly during a first stage of assembly according to the present invention.
Figure 6:
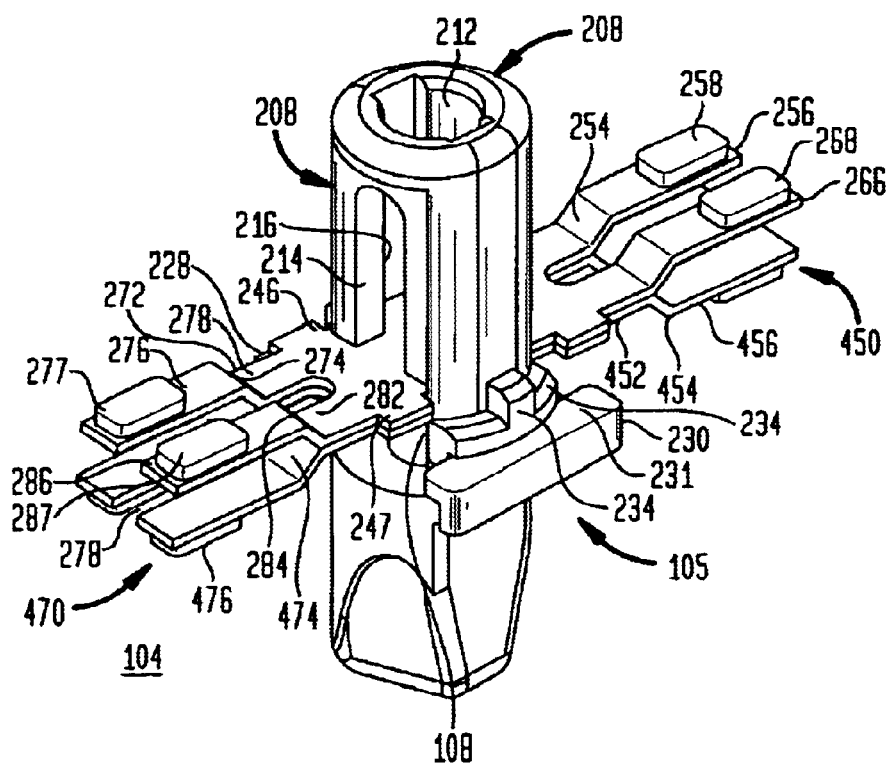
FIG. 6 is a perspective view of the pusher assembly at a second stage of assembly according to the present invention.

Turning now to FIGS. 5 and 6, the method of assembly of the pusher assembly 104 is shown. In particular, the movable contacts 106 and 107 are inserted into the upper window portion 216 in the vertical position. As shown in FIG. 5, the movable contact 107 is already positioned within the main window portion 218. That is, the movable contact 107 was moved downward from the entry window portion 216 into the main window portion 218 by depressing the contact spring 108. When the side of the movable contact 107 cleared the lower end of the entry window portion 216 at the shoulder portions 219, the movable contact 107 was then rotated into a horizontal position as shown in FIG. 6. The force of the contact spring 108 urges the movable contact 107 to a resting position against the shoulders 219. That is, the body portion 292 makes contact with the shoulders 219. The movable contact 106 is then inserted in the same manner. However, the movable contact 106 should be rotated such that the movable contacts are positioned in a back to back arrangement as shown in FIG. 6.

As also can be see in FIG. 6, the flanges 246 and 247 extend beyond the main window portion 218 preventing any lateral movement of the movable contact 106 within the main window portion 218. The flanges 244 and 245 also prevent any lateral movement of the movable contact 106 in the opposite direction. Similarly, flanges 294, 295, 445 and 446 of the movable contact 107 limit its movement within the pusher.

Although a method of assembling the pusher assembly by inserting the movable contacts 106 and 107 into the main window portion 218 separately, the movable contacts 106 and 107 could be inserted into the pusher 105 simultaneously. In particular, the movable contacts 106 and 107 could be positioned back to back as shown in FIG. 2, and then inserted into the entry window portion 216. If the entry window portion 216 is not wide enough to receive both movable contacts 106 and 107 simultaneously, the movable contacts 106 and 107 could be inserted into the entry window 216 separately, and then moved simultaneously into the main window portion 218. That is, with the movable contacts positioned back to back in the orientation shown in FIG. 2, the movable contacts are then moved simultaneously from the entry window portion 216 into the main window portion 218 by depressing the contact spring 108. The movable contacts 106 and 107 are then moved into a resting position as shown in FIG. 6 by simultaneously rotating the movable contacts 106 and 107 into a horizontal position.

The assembled pusher assembly 104 shown in FIG. 6 provides considerable advantage in the assembly of a contact block assembly shown in FIG. 1. In particular, once the pusher assembly 105 is assembled, an assembler of the contact block assembly 100 need not be concerned that the movable contacts 106 and 107 or the contact spring 108 will become dislodged during assembly. Similarly, the pusher assembly 104 could be assembled prior to any assembly of the contact block assembly 100, providing flexibility in assembling the contact block assembly 100. While the movable contact 106 is shown resting against the shoulders 219, the movable contact may not be resting against the shoulders when the contact block assembly 100 is assembled or operated.

Figure 7:
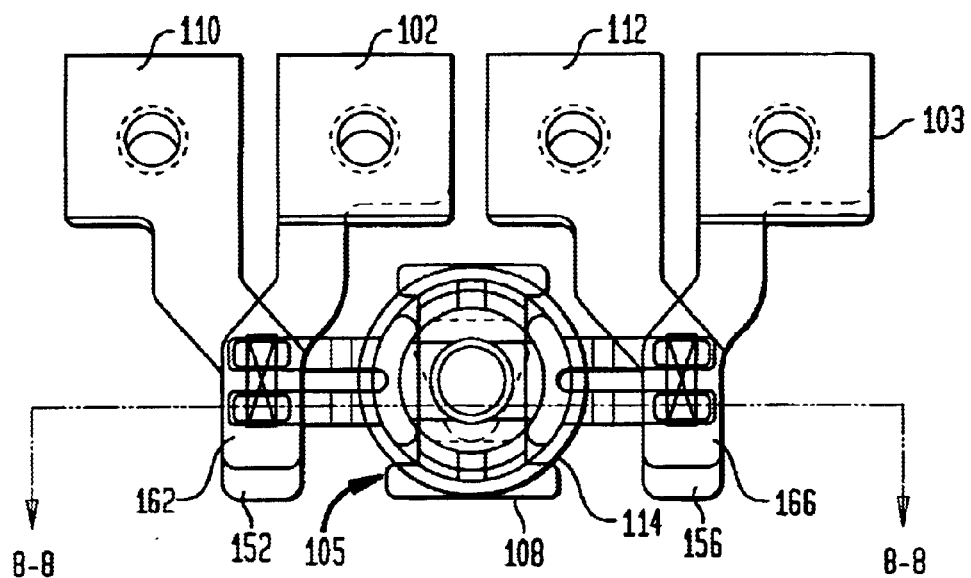
FIG. 7 is a top plan view of elements of a pusher assembly according to the present invention.
Figure 8:
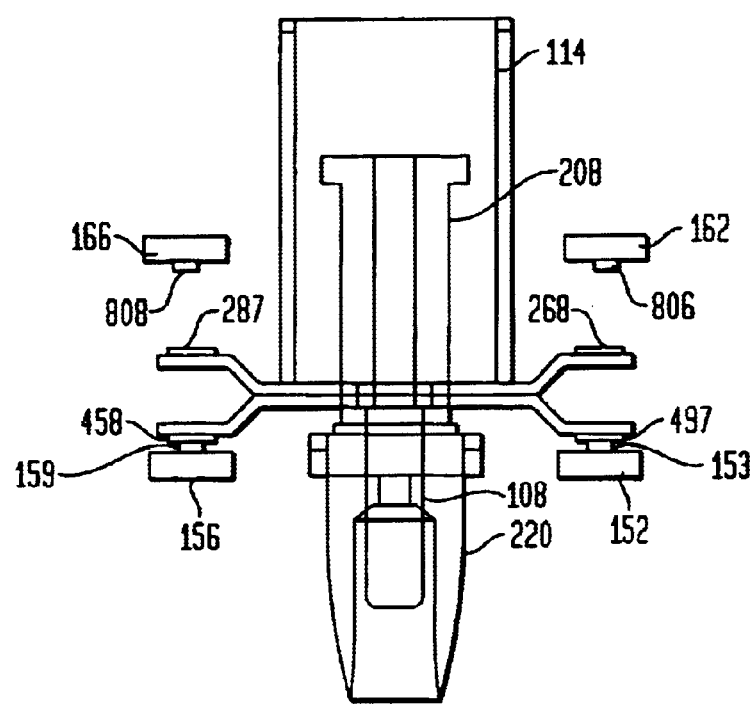
FIG. 8 is a cross sectional view of elements of a pusher assembly taken at lines 8—8 according to the present invention.

Turning now to FIGS. 7 and 8, a perspective view of the assembled components 115 shows the operation of a contact block assembly incorporating a pair of back to back movable contacts according to the present invention. When in a full-out position, contact surfaces 458 and 477 of the movable contact 107 make contact with corresponding contact surfaces 175 and 153 of stationary contacts 156 and 152, respectively. When the pusher is pressed, contact surfaces 287 and 268 of the movable contact 106 make contact with corresponding contact surfaces 808 and 806 of stationary contacts 166 and 162, respectively.

It can therefore be appreciated that a new and novel movable contact and method for a pusher assembly having a movable contact has been described. The new movable contact, which can be stacked back to back with itself, significantly reduces the cost of a 2-pole contact block assembly because a single movable contact can be use for 1-pole contact blocks and two movable contacts can be used for 2 pole contact blocks. The single movable contact of the present invention is easy to fabricate because it has silver contacts on only one side, and it is inexpensive because it is purchased in high volume. It will be appreciated by those skilled in the art that, given the teaching herein, numerous alternatives and equivalent will be seen to exist which incorporate the disclosed invention. For example, although two separate movable contacts are used, a single movable contact having the features of the back to back movable contact could be employed according to the present invention. As a result, the invention is not to be limited by the foregoing exemplary embodiments, but only by the following claims.

I claim:

1. A pusher assembly for use in a contact block assembly, said pusher assembly comprising:
   a pusher;
   a window extending through said pusher, wherein said window comprises a first window formed in a first portion of a body portion, and a second window formed adjacent to said first window in said first portion of said body portion, said second window being wider than said first window;
   a recess formed in said first portion of said body portion extending to a second portion of said body portion;
   a spring positioned within said recess;
   a first movable contact positioned within said window; and
   a second movable contact positioned back to back with said first movable contact within said window.

2. The pusher assembly of claim 1 wherein said first movable contact has a substantially flat body portion extending from a first end to a second end, a first contact potion coupled to said first end of said substantially flat body portion, said first contact portion having a first pair of contact fingers; and a second contact portion coupled to said second end of said substantially flat body portion, said second contact portion having a second pair of contact fingers, each contact finger of said first and second pairs of contact fingers having an inclined portion and a contact surface.

3. The pusher assembly of claim 2 wherein said second movable contact has a substantially flat body portion extending from a first end to a second end, a first contact portion coupled to said first end of said substantially flat body portion, said first contact portion having a first pair of contact fingers; and a second contact portion coupled to said second end of said substantially flat body portion, said second contact portion having a second pair of contact fingers, each contact finger of said first and second pairs of contact fingers having an inclined portion and a contact surface, said second movable contact being positioned opposite said first movable contact with said substantially flat body portion of said first movable contact adjacent to said substantially flat body portion of said second movable contact.

4. The pusher assembly of claim 1 wherein said first movable contact has a first pair of flanges and second movable contact has a second pair of flanges for retaining said first and said second movable contacts within said window.

5. The pusher assembly of claim 1 further comprising shoulders between said first window and said second window.

6. The pusher assembly of claim 5 wherein said first movable contact and said second movable contact are positioned within said second window.

7. The pusher assembly of claim 6 wherein said spring movably retains said first movable contact and said second movable contact against said shoulders when said first and second movable contacts are positioned within said second window.

8. The pusher assembly of claim 1, each said movable contact comprising:
   a substantially flat contact body portion extending from a first end to a second end,
   a first contact portion coupled to said first end of said substantially flat contact body portion, said first contact portion having a first pair of contact fingers, each contact finger of said first pair of contact fingers having an inclined portion leading to a contact surface which is substantially parallel to and facing away from a plane of said substantially flat contact body portion, and
   second contact portion coupled to said second end of said substantially flat contact body portion, said second contact portion having a second pair of contact fingers, each contact finger of said second pair of contact fingers having an inclined portion leading to a contact surface which is substantially parallel to said substantially flat contact body portion.

9. The pusher assembly of claim 8 further comprising a first gap separating said first pair of contact fingers and a second gap separating said second pair of contact fingers.

10. The pusher assembly of claim 8 further comprising a first pair of retention tabs.

11. The pusher assembly of claim 10 wherein said first retention tab is positioned on a first edge of said contact body portion and said second retention tab is positioned on a second edge of said contact body portion.

12. The pusher assembly of claim 8 wherein said inclined portions of said first contact portion and said second contact portion extend from a first side of said contact body portion.

13. The pusher assembly of claim 1, each said movable contact comprising:
   a substantially flat contact body portion extending from a first end to a second end,
   a first contact portion coupled to said first end of said contact body portion, said first contact portion having a first pair of contact fingers, each contact finger of said first pair of contact fingers having an inclined portion and a contact element; and
   a second contact portion coupled to said second end of said contact body portion, said second contact portion having a second pair of contact fingers, each contact finger of said second pair of contact fingers having an inclined portion and a contact element.

14. The pusher assembly of claim 13 further comprising a first gap separating said first pair of contact fingers and a second gap separating said second pair of contact fingers.

15. The pusher assembly of claim 13 further comprising a first pair of flanges for retaining said movable contacts within said window.

16. The pusher assembly of claim 15 wherein a first flange is positioned on a first edge of said contact body portion and a second flange is positioned on a second edge of said contact body portion.

17. The pusher assembly of claim 13 wherein said inclined portions of said first contact portion and said second contact portion extend from a first side of said contact body portion.

18. The pusher assembly of claim 1 wherein said first movable contact comprises a substantially flat contact body portion extending from a first end to a second end, a first contact portion coupled to said first end of said contact body portion, said first contact portion having a first pair of contact fingers, each contact finger of said first pair of contact fingers having an inclined portion and a contact surface, and a second contact portion coupled to said second end of said contact body portion, said second contact portion having a second pair of contact fingers, each contact finger of said second pair of contact fingers having an inclined portion and a contact surface, and said second movable contact comprises a substantially flat contact body portion extending from a first end to a second end, a third contact portion coupled to said first end of said substantially flat contact body portion, said third contact portion having a third pair of contact fingers, each contact finger of said third pair of contact fingers having an inclined portion and a contact surface; and a second contact portion coupled to said second end of said substantially flat contact body portion, said second contact portion having a fourth pair of contact fingers, each contact finger of said fourth pair of contact fingers having an inclined portion and a contact surface, the substantially flat contact body portions of the first and second movable contacts being positioned back to back.

19. The pusher assembly of claim 18 further comprising a first flange and a second flange coupled to said substantially flat contact body portion of said first movable contact and a third flange and a fourth flange coupled to said substantially flat body portion of said second movable contact.

20. The pusher assembly of claim 19 wherein said first flange is positioned on a first edge of said contact body portion and a second flange is positioned on said second edge of said substantially flat contact body portion of said first movable contact and wherein said third flange is positioned on a first edge of said contact body portion and said fourth flange is positioned on said second edge of said substantially flat contact body portion of said second movable contact.

21. The pusher assembly of claim 18 wherein said inclined portions of said first movable contact portion and said second movable contact extend from a first side of said substantially flat contact body portion.

22. A method of assembling a pusher assembly having a movable contact, said method comprising:
    inserting a first movable contact into a pusher;
    inserting a second movable contact into said pusher;
    retaining said first movable contact and said second movable contact within said pusher by a spring,
    wherein said steps of inserting said first movable contact and said second movable contacts are performed simultaneously.

23. The method of claim 22 wherein said step of retaining comprises retaining said first and second movable contacts against a shoulder of a window.

24. A method of assembling a pusher assembly having a movable contact, said method comprising:
    inserting a first movable contact into a pusher;
    inserting a second movable contact into said pusher;
    rotating said first and second movable contacts to a substantially horizontal position; and
    retaining said first movable contact and said second movable contact within said pusher by a spring.

25. The method of claim 24 wherein said step of rotating said first and second movable contact comprises a step of rotating said first movable contact to a substantially horizontal position and a second step of rotating said second movable contact to a substantially horizontal position.

26. The method of claim 24 wherein said step of retaining comprises retaining said first and second movable contacts against a shoulder of a window.

27. A method for assembling a pusher assembly, said method comprising the steps of:
    inserting a first movable contact and a second movable contact into a first position in a first window of a pusher;
    moving said first movable contact and said second movable contact to a second window of said pusher;
    rotating first movable contact and said second movable contact to a second position within said second window; and
    positioning said first movable contact and said second movable contact, defining a pair of movable contacts, adjacent to each other.

28. The method of claim 27 wherein said step of inserting said first of movable contact and said second movable contact comprises inserting said first movable contact and said second movable contact in a substantially vertical position through a body portion of said pusher.

29. The method of claim 27 wherein said step of inserting said first movable contact and said second movable contact comprises a first step of inserting said first movable contact and a second step of inserting a second movable contact.

30. The method of claim 27 wherein said step of rotating said first movable contact and said second movable contact comprises rotating said first movable contact and said second movable contact to a substantially horizontal position.

31. The method of claim 27 wherein said step of rotating comprises a first step of rotating said first movable contact to a substantially horizontal position after said first movable contact is moved to said second window, and a second step of rotating said second movable contact after said first step of rotating said first movable contact.

32. The method of claim 27 further comprising a step of retaining said pair of movable contacts against a shoulder of said second window.

33. The method of claim 32 wherein said step of retaining comprises retaining said first and second movable contacts against said shoulders by a spring when said first and second movable contacts are positioned within said second window.

34. A method for assembling a pusher assembly, said method comprising the steps of:
    inserting a spring into a recess of a pusher;
    inserting a first movable contact into in a first window of said pusher in a substantially vertical orientation;
    moving said first of movable contact to a second window of said pusher;
    rotating said first movable contact to a substantially horizontal orientation within said second window;
    inserting a second movable contact into in a first window of said pusher in a substantially vertical orientation;
    moving said second of movable contact to a second window of said pusher;
    rotating said second movable contact to a substantially horizontal orientation within said second window; and
    retaining said first and second movable contacts within said second window with a spring.

* * * * *